(12) United States Patent
Ando et al.

(10) Patent No.: US 9,152,519 B2
(45) Date of Patent: Oct. 6, 2015

(54) STORAGE CONTROL APPARATUS, METHOD OF SETTING REFERENCE TIME, AND COMPUTER-READABLE STORAGE MEDIUM STORING REFERENCE TIME SETTING PROGRAM

(71) Applicant: FUJITSU LIMITED, Kawasaki-shi (JP)

(72) Inventors: Shun Ando, Kahoku (JP); Yuji Noda, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 248 days.

(21) Appl. No.: 13/858,130

(22) Filed: Apr. 8, 2013

(65) Prior Publication Data

US 2013/0238941 A1 Sep. 12, 2013

Related U.S. Application Data

(63) Continuation of application No. PCT/JP2010/068076, filed on Oct. 14, 2010.

(51) Int. Cl.
*G06F 11/00* (2006.01)
*G06F 11/26* (2006.01)
*G06F 11/07* (2006.01)
*G06F 3/06* (2006.01)

(52) U.S. Cl.
CPC ............ *G06F 11/26* (2013.01); *G06F 11/0757* (2013.01); *G06F 3/0619* (2013.01); *G06F 3/0676* (2013.01)

(58) Field of Classification Search
CPC ............. H05K 999/99; G11B 2220/20; G11B 20/1883; G06F 11/0757; G06F 3/0619; G06F 3/0676
See application file for complete search history.

(56) References Cited

U.S. PATENT DOCUMENTS 5,450,609 A * 9/1995 Schultz et al. ................. 711/114
5,749,086 A * 5/1998 Ryan .............................. 711/105
5,828,583 A * 10/1998 Bush et al. ..................... 702/185

(Continued)

FOREIGN PATENT DOCUMENTS

JP 11-167470 6/1999
JP 2003-256353 9/2003

(Continued)

OTHER PUBLICATIONS

International Search Report, mailed in connection with PCT/JP2010/068076 and mailed Nov. 16, 2010.

(Continued)

*Primary Examiner* — Amine Riad
(74) *Attorney, Agent, or Firm* — Fujitsu Patent Center

(57) ABSTRACT

With a command delay time measurement unit that issues a first test command while the medium error status generator generates the medium error status, and measures a delay time of a command response for the first test command as a command delay time, and a response interval measurement unit that issues a plurality of second test commands to the storage apparatuses to be examined under a higher load when no error occurs, and measures an interval of each command response for the plurality of second test commands as a response interval, and by calculating, for each of the plurality of types of the storage apparatuses, a reference time for each storage apparatus type by adding the command delay time and the response interval, an error can be detected more efficiently.

12 Claims, 11 Drawing Sheets

(56) References Cited

U.S. PATENT DOCUMENTS

| | | | |
|---|---|---|---|
| 5,897,400 A * | 4/1999 | Amberg et al. | 439/717 |
| 6,014,707 A * | 1/2000 | Miller et al. | 709/232 |
| 6,219,727 B1 * | 4/2001 | Kailash et al. | 710/48 |
| 6,282,501 B1 * | 8/2001 | Assouad | 702/117 |
| 6,366,969 B1 * | 4/2002 | Hanson | 710/52 |
| 6,366,981 B1 * | 4/2002 | Koike | 711/114 |
| 6,378,013 B1 * | 4/2002 | Hanson | 710/100 |
| 6,408,406 B1 * | 6/2002 | Parris | 714/41 |
| 6,728,747 B1 * | 4/2004 | Jenkins et al. | 718/101 |
| 7,565,439 B2 * | 7/2009 | Mizuno et al. | 709/230 |
| 7,610,515 B2 | 10/2009 | Kosuge et al. | |
| 7,664,617 B2 * | 2/2010 | Greco et al. | 702/182 |
| 7,774,644 B2 * | 8/2010 | Fairhurst et al. | 714/6.13 |
| 7,853,831 B2 * | 12/2010 | Subramanian et al. | 714/43 |
| 8,250,453 B2 * | 8/2012 | Matsushige | 714/819 |
| 8,768,650 B2 * | 7/2014 | Cialini et al. | 702/186 |
| 2001/0032298 A1 | 10/2001 | Emons | |
| 2003/0061367 A1 * | 3/2003 | Shah | 709/230 |
| 2003/0204583 A1 * | 10/2003 | Kaneda et al. | 709/223 |
| 2004/0054850 A1 * | 3/2004 | Fisk | 711/112 |
| 2004/0073677 A1 * | 4/2004 | Honma et al. | 709/226 |
| 2004/0193827 A1 * | 9/2004 | Mogi et al. | 711/170 |
| 2005/0154828 A1 * | 7/2005 | Sugino et al. | 711/114 |
| 2007/0074077 A1 * | 3/2007 | Markow et al. | 714/36 |
| 2007/0255518 A1 * | 11/2007 | Jeon et al. | 702/113 |
| 2008/0140908 A1 | 6/2008 | Miyata | |
| 2009/0119539 A1 * | 5/2009 | Fairhurst et al. | 714/9 |
| 2009/0235110 A1 * | 9/2009 | Kurokawa | 714/3 |
| 2011/0185268 A1 * | 7/2011 | Matsushige | 714/819 |
| 2012/0221748 A1 * | 8/2012 | Carlson et al. | 710/18 |
| 2012/0331344 A1 * | 12/2012 | Dobbelstein et al. | 714/28 |
| 2013/0238941 A1 * | 9/2013 | Ando et al. | 714/42 |

FOREIGN PATENT DOCUMENTS

| | | |
|---|---|---|
| JP | 2003-530640 | 10/2003 |
| JP | 2004-118397 | 4/2004 |
| JP | 2004-139482 | 5/2004 |
| JP | 2004-302751 | 10/2004 |
| JP | 2007-122396 A | 5/2007 |
| JP | 2008-146141 A | 6/2008 |
| JP | 2009-211162 | 9/2009 |
| JP | 2009-223702 | 10/2009 |
| JP | 2009-282880 | 12/2009 |
| JP | 2010-113383 | 5/2010 |
| JP | 2010-224954 A | 10/2010 |

OTHER PUBLICATIONS

Japanese Office Action mailed Oct. 29, 2013 for corresponding Japanese Application No. 2012-538513, with Partial English-language Translation.

* cited by examiner

FIG. 5

| DISK NUMBER | 1 | 2 | 3 | 4 | |
|---|---|---|---|---|---|
| DISK TYPE | A | B | C | B | |
| BURST LENGTH (bl) | bl—A | bl—B | bl—C | bl—B | |
| TOTAL DATA AMOUNT / COMMAND COUNT (dpc) | dpc—1 | dpc—2 | dpc—3 | dpc—4 | |
| AVERAGE RESPONSE INTERVAL (R) | R—1 | R—2 | R—3 | R—4 | |
| AVERAGE CONNECTION COUNT (C) | C—1 | C—2 | C—3 | C—4 | |
| RESPONSE DELAY COEFFICIENT (DK) | DK—1 | DK—2 | DK—3 | DK—4 | |
| COMMAND DELAY TIME (AVERAGE) UPON MEDIUM ERROR (tavg) | tavg—A | tavg—B | tavg—C | tavg—B | |
| RESPONSE INTERVAL (tr) | tr—1 | tr—2 | tr—3 | tr—4 | |
| TIMEOUT TIME (Tout) | Tout—1 | Tout—2 | Tout—3 | Tout—4 | |

D2

STORAGE CONTROL APPARATUS, METHOD OF SETTING REFERENCE TIME, AND COMPUTER-READABLE STORAGE MEDIUM STORING REFERENCE TIME SETTING PROGRAM

CROSS-REFERENCE TO RELATED APPLICATION

This application is based upon and claims the benefit of priority of the prior International Patent Application No. PCT/JP2010/068076, filed on Oct. 14, 2010, the entire contents of which are incorporated herein by reference.

FIELD

The present disclosure relates to a technique to detect an abnormality in a storage apparatus.

BACKGROUND

In a data storage system including hard disk drives (HDDs) in multiple types, an increased load on a back end causes a congestion on a data propagation path, adversely effecting the time until a command is completed (command completion time).

In a data storage system, a reference time referred to as a timeout time is generally set. When a command is issued to a HDD and the time waiting for a response to that command exceeds the timeout time, it is determined that an error occurs in that HDD.

In a conventional data storage system, a single timeout time is set for all HDDs provided in the system (refer to Patent Reference 1: Japanese Laid-open Patent Publication No. 2004-139482, for example).

However, in such a conventional data storage system, when there are HDDs in multiple types, the common timeout time set for all HDDs provided in the system is determined based on HDDs having the lowest response capability. Further, the timeout time is set based on the maximum load on the propagation path which varies dynamically during an operation of the data storage system.

Accordingly, the timeout time set to a greater value lengthens the error detection time during the operation of the system operation.

In contrast, if a timeout time would be set to a smaller value, upon a delay of a command completion time, it cannot be determined whether the delay is due to the higher load on the propagation path or due to a failure in an HDD, which would hinder the data storage system from being operated efficiently.

SUMMARY

Accordingly, a storage control apparatus is provided that is capable of being connected to storage apparatuses of a plurality of types, the storage control apparatus including: a storage apparatus selector that selects storage apparatuses to be examined from each of the plurality of types of the storage apparatuses; a medium error status generator that generates a medium error status in the storage apparatuses to be examined; a command delay time measurement unit that issues a first test command while the medium error status generator generates the medium error status, and measures a delay time of a command response for the first test command as a command delay time; a response interval measurement unit that issues a plurality of second test commands to the storage apparatuses to be examined under a higher load when no error occurs, and measures an interval of each command response for the plurality of second test commands as a response interval; a reference time calculator that calculates, for each of the plurality of types of the storage apparatuses, a reference time for each storage apparatus type by adding the command delay time and the response interval; and an abnormality detector that detects an abnormality upon issuing a command to the storage apparatuses, based on the reference time calculated by the reference time calculator.

Further, a method of setting a reference time used for detecting, in a storage control apparatus connected to storage apparatuses of a plurality of types, an abnormality when a command is executed to the storage apparatuses, is provided, the method including: selecting storage apparatuses to be examined from each of the plurality of types of the storage apparatuses; generating a medium error status in the storage apparatuses to be examined; issuing a first test command while generating the medium error status in the storage apparatuses to be examined, and measuring a delay time of a command response for the first test command as a command delay time; issuing a plurality of second test commands to the storage apparatuses to be examined under a higher load when no error occurs, and measures an interval of each command response for the plurality of second test commands as a response interval; and calculating, for each of the plurality of types of the storage apparatuses, a reference time for each storage apparatus type by adding the command delay time and the response interval.

Further, a computer-readable storage medium storing a reference time setting program that makes a computer set a reference time used for detecting, in a storage control apparatus connected to storage apparatuses of a plurality of types, an abnormality when a command is executed to the storage apparatuses, is provided, the program making the computer: select storage apparatuses to be examined from each of the plurality of types of the storage apparatuses; generate a medium error status in the storage apparatuses to be examined; issue a first test command while generating the medium error status in the storage apparatuses to be examined, and measure a delay time of a command response for the first test command as a command delay time; issue a plurality of second test commands to the storage apparatuses to be examined under a higher load when no error occurs, and measure an interval of each command response for the plurality of second test commands as a response interval; and calculate, for each of the plurality of types of the storage apparatuses, a reference time for each storage apparatus type by adding the command delay time and the response interval.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 5 is a diagram illustrating disk information in a storage system as one example of an embodiment;

DESCRIPTION OF EMBODIMENTS

Hereinafter, embodiments of the present disclosure will be described with reference to the drawings.

Figure 1:
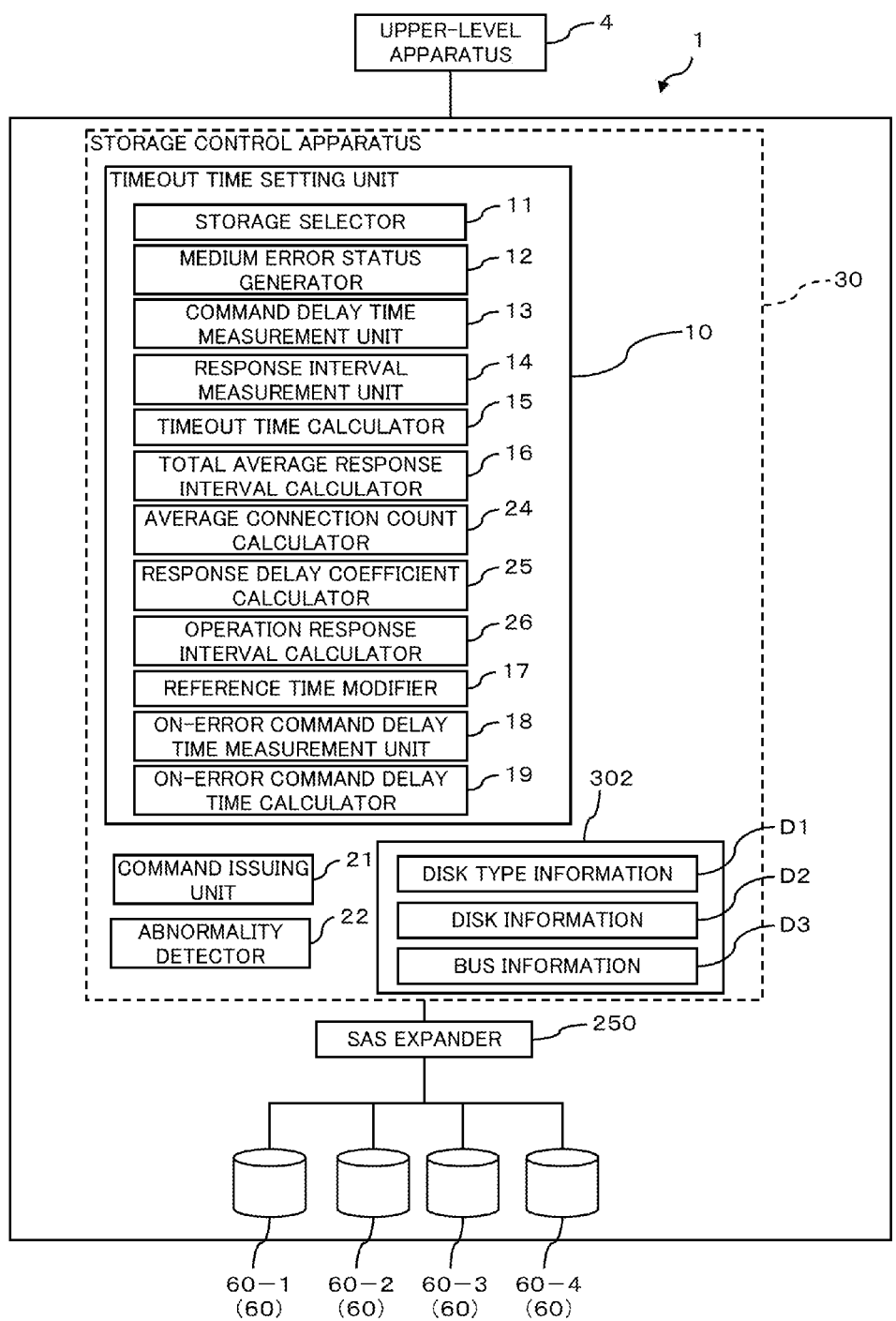
FIG. 1 is a diagram schematically illustrating an example of a functional configuration of a storage system as one example of an embodiment.
Figure 2:
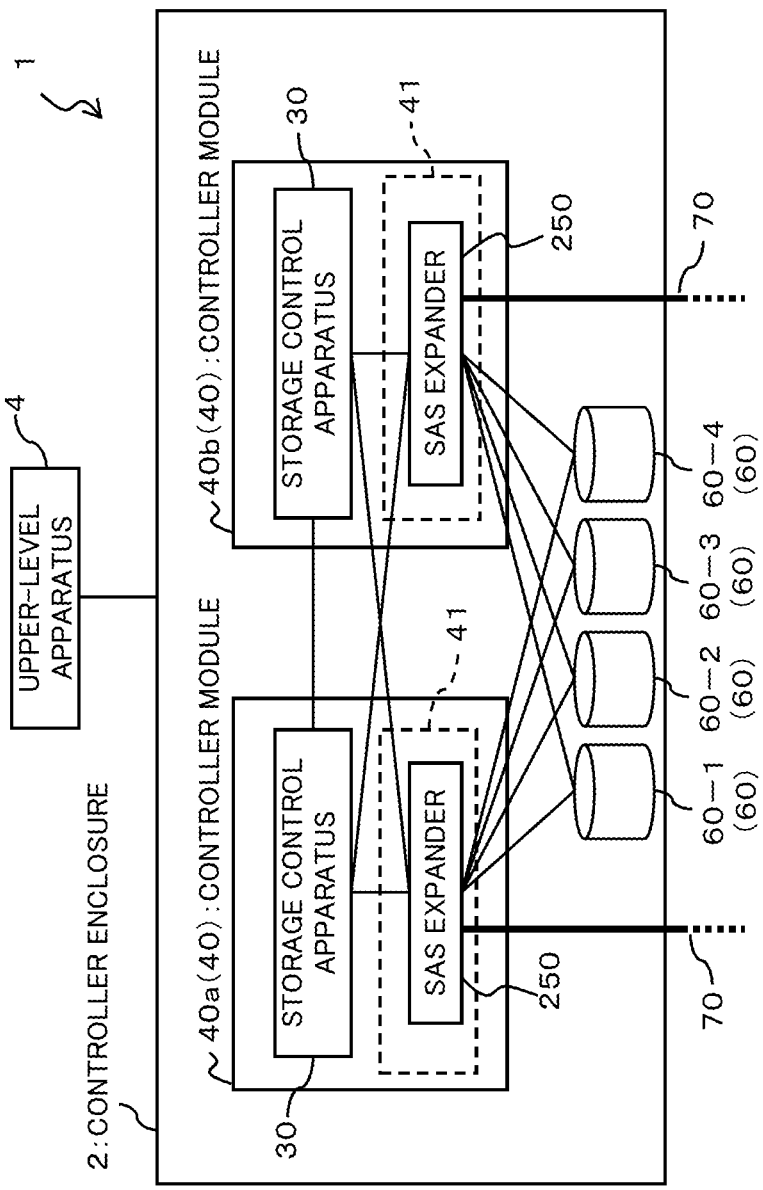
FIG. 2 is a diagram schematically illustrating an example of a hardware configuration of a storage system as one example of an embodiment.
Figure 3:
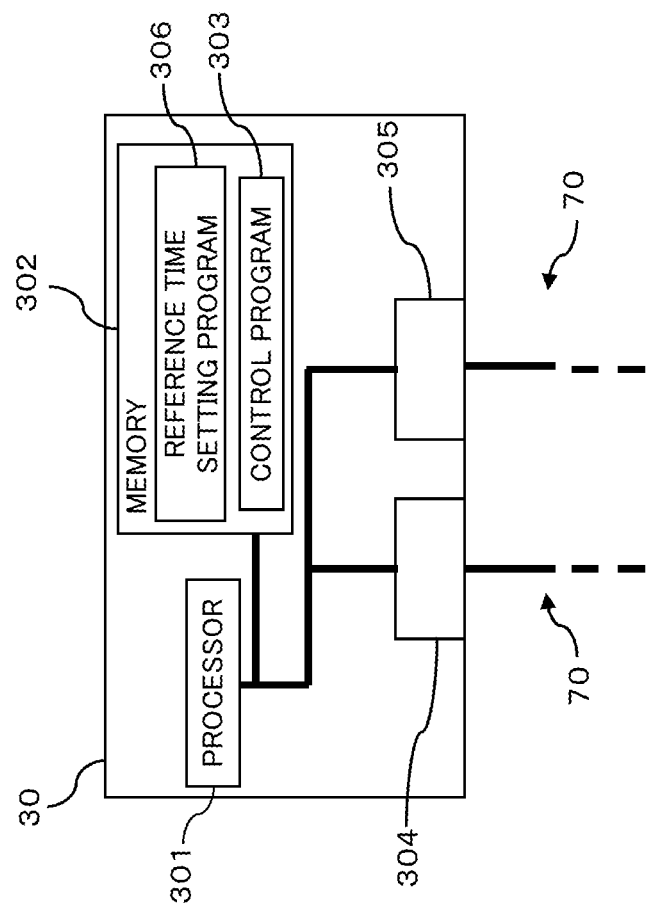
FIG. 3 is a diagram schematically illustrating an example of a hardware configuration of a storage control apparatus in a storage system as one example of an embodiment.

FIG. 1 is a diagram schematically illustrating an example of a functional configuration of a storage system as one example of an embodiment, and FIG. 2 is a diagram schematically illustrating an example of a hardware configuration thereof. FIG. 3 is a diagram schematically illustrating an example of a hardware configuration of a storage control apparatus 30 in the storage system 1 as one example of an embodiment.

As depicted in FIG. 1, the storage system 1 of the present embodiment is connected to one or more (one in the example depicted in FIG. 1) upper-level apparatus 4, thereby providing storage areas to the upper-level apparatus 4. The upper-level apparatus 4 is a computer having a server function (host computer), for example.

As depicted in FIG. 2, the storage system 1 includes a controller enclosure 2, which is connected to the upper-level apparatus 4. The controller enclosure 2 also includes controller modules 40a and 40b, and multiple (four in the example depicted in FIG. 2) hard disk drives (HDDs, storage apparatuses) 60-1, 60-2, 60-3, and 60-4.

The HDDs 60-1, 60-2, 60-3, and 60-4 are storages (storage apparatuses) that can store data in readable and writable manner, and read and write data from and to storage media (not illustrated) by sequentially processing commands sent from the storage control apparatus 30. Each of the HDDs 60-1, 60-2, 60-3, and 60-4 is communicatively connected to respective SAS expanders 250 in the controller modules 40a and 40b.

Note that the reference symbols 60-1 to 60-4 are used hereinafter for referring to a specific HDD while reference symbol 60 is used when reference is made to any of the multiple HDDs.

Hereinafter, the numbers following the hyphen (-) in the reference symbols 60-1, 60-2, 60-3, and 60-4 referencing to the HDDs are called as "disk numbers". Hereinafter, the HDDs 60 are sometimes referred to by these disk numbers, for example, the HDD 60-1 may be referred to as "disk 1" and the HDD 60-2 may be referred to as "disk 2".

In the present embodiment, the HDDs 60 include HDDs in multiple types, for example, the HDDs 60 include HDDs of three types (models), Types A, B, and C. Each type of the HDDs 60 has different characteristics. For example, each disk type has different burst length and command delay time upon a medium error in the HDD 60.

As used herein, the burst length refers to the size of data that is transferred in a single connection, i.e., the size of data that is transferred in a single cycle of open of a bus (Open), data transfer (DataTx), and close (Close). The burst lengths generally vary depend on the size of the data transfer buffer provided in the HDDs 60, the IO performance and/or, for example, and are different for the types of the HDDs 60.

The HDDs 60 have a queuing function that temporarily store commands sent from the storage control apparatus 30 in a queue (buffer) that is not illustrated. One HDD 60 can process only a single command at a time, and sequentially processes commands stored in its queue.

In case of Serial Attached SCSI (SAS) devices, when the load on the bus (SAS) is increased, the priorities of the bus right are equalized in a unit of connection. This results in an increase in the delay ratio of responses in types with shorter burst length as compared to types with longer burst lengths. More specifically, types with longer burst lengths can process data in the same size faster than types with shorter burst lengths.

Note that, in the present embodiment, the HDD 60-1 has Type A, the HDD 60-2 and the HDD 60-4 have Type B, and the HDD 60-3 has Type C.

The controller modules 40a and 40b each execute a wide variety of controls, and executes various controls, such as access control to the HDDs 60-1 to 60-4, in accordance with a storage access request from the upper-level apparatus 4. The controller modules 40a and 40b have substantially similar configurations, and respectively include a storage control apparatus 30 and an expander module 41.

Note that the reference symbols 40a and 40b are used when a reference to a specific one of the multiple controller modules is required to be made while reference symbol 40 is used when reference is made to any one of the controller modules.

In the controller enclosure 2, the storage control apparatuses 30 in the controller modules 40a and 40b are communicatively connected to each other.

Each storage control apparatus 30 is connected to the SAS expander 250 in the local controller module 40a (30b) and the SAS expander 250 in the remote controller module 30b (30a).

Each SAS expander 250 relays between the storage control apparatus 30 and the HDDs 60, and transfers data in accordance with a storage access request from the upper-level apparatus 4. The SAS expander 250 also relays data to and from the drive enclosure which is not illustrated.

Each storage control apparatus 30 executes a wide variety of controls, such as data access control on the HDDs 60 and implementation of an RAID, and is an RAID controller, for example. As depicted in FIG. 3, the storage control apparatus 30 includes a processor 301, a memory 302, and SAS controllers 304 and 305.

The memory 302 is a storage that stores various types of data and programs, and data and the like are temporarily stored in the memory 302 upon the processor 301 executing computations. In the memory 302, disk type information D1, disk information D2, and bus information D3 are also stored.

In the memory 302, a control program 303 and a reference time setting program 306, which will be described later, are also stored (refer to FIG. 3).

Figure 4:
FIG. 4 is a diagram illustrating disk type information in a storage system as one example of an embodiment.

FIG. 4 is a diagram illustrating the disk type information D1, and FIG. 5 is a diagram illustrating the disk information D2, in the storage system 1 as one example of an embodiment.

The disk type information D1 is information representing characteristics of each types of the HDDs 60, and, in the present embodiment, is a table listing command delay times (averages) upon a medium error status tavg and burst lengths bl for the respective types, while relating them to each other.

In the example depicted in FIG. 4, a command delay time upon a medium error status in each type is expressed by the reference symbol "tavg" representing the command delay time upon a medium error status, followed by "- (hyphen)" and the symbol representing that type (i.e., one of A, B, and C). Similarly, a burst length in each type is expressed by the reference symbol "bl" representing the burst length, followed by "- (hyphen)" and the symbol representing that type (i.e., one of A, B, and C).

Specifically, in the example depicted in FIG. 4, the command delay time upon a medium error status tavg-A and the burst length bl-A are those for Type A. Similarly, the command delay time upon a medium error status tavg-B and the burst length bl-B are those for Type B, while command delay time upon a medium error status tavg-C and the burst length bl-C are those for Type C.

Note that the reference symbols tavg-A to tavg-C are used when a reference to a specific one of the multiple commands delay times upon a medium error status is required to be made while reference symbol tavg is used when reference is made to any one of the command delay times upon a medium error status. Furthermore, the reference symbols bl-A to bl-C are used for referring to a specific one of the multiple burst lengths while reference symbol bl is used when reference is made to any of the burst lengths.

The disk information D2 is information representing characteristics of each HDD 60, and, in the present embodiment, is a table listing types, burst lengths bl, total data amount/command counts dpc, average response intervals R, average connection counts C, response delay coefficients DK, command delay times (averages) upon a medium error status tavg, response intervals tr, and timeout times (reference time) Tout, for the respective types, while relating them to each other for the disk number of each HDD 60.

As used herein, the total data amount/command count dpc is the average data amount (size) per command, and is calculated by an average connection count calculator 24, which will be described later, for example.

The average response interval R is the average interval for multiple responses received from the HDD 60 while the storage system 1 operates, and is calculated by a response interval measurement unit 14, which will be described later.

The average connection count C is an average connection count per command while the storage system 1 operates. In other words, the average connection count is the average count of connections generated for a single command in that HDD 60. The average connection count C is calculated by an average connection count calculator 24, which will be described later.

The response delay coefficient DK is a coefficient determined based on the average connection count determined while the storage system 1 operates, and is used for correcting the response interval tr (described later) during the operation of the storage system 1 operates. The response delay coefficient DK is determined by a response delay coefficient calculator 25, which will be described later.

The response interval tr is an interval between responses made for a command issue to the HDD 60 without any medium error, during startup of the storage apparatus 30. The response interval tr is measured by a response interval measurement unit 14, which will be described later.

The timeout time Tout is a reference value (time) for determining by an abnormality detector 22, which will be described later, that an error (timeout error) occurs in the HDD 60, and is set by a timeout time setting unit 10, which will be described later.

In the example depicted in FIG. 5, a normal response interval of each disk number is expressed by the reference symbol "tr" representing the response interval, followed by "- (hyphen)" and the symbol representing that disk number (i.e., one of 1-4). Similarly, a timeout time of each disk number is expressed by the reference symbol "Tout" representing the timeout time, followed by "- (hyphen)" and the symbol representing that disk number (i.e., one of 1-4).

Further similarly, total data amount/command count, an average response interval, an average connection count, a response delay coefficient, and a timeout time of each disk number are expressed by the reference symbols "dpc", "R", "C", "DK", and "Tout" representing the total data amount/command count, the average response interval, the average connection count response delay coefficient and timeout time, respectively, followed by "- (hyphen)" and the disk number.

More specifically, in the example depicted in FIG. 5, for example, Type A, the burst length bl-A, the total data amount/command count dpc-1, the average response interval R-1, the average connection count C-1, the response delay coefficient DK-1, the command delay time upon a medium error status tavg-A, the response interval tr-1, and the timeout time Tout-1 are for the disk number 1.

Note that the reference symbols tr-1 to tr-4 are used hereinafter for referring to a specific one of multiple responses intervals while reference symbol tr is used when reference is made to any of the response intervals. Furthermore, the reference symbols Tout-1 to Tout-4 are used for referring to a specific one of the plurality of timeout times while reference symbol Tout is used when reference is made to any of the timeout times.

The bus information D3 is information of the performances (characteristics) of the bus (SAS in this embodiment) used in the storage system 1, and in the present embodiment, is the average response interval for all of the buses Ravg. The average response interval for all of the buses Ravg is calculated by a total average response interval calculator 16, which will be described later. How the average response interval for all of the buses Ravg is calculated will also be described later.

The SAS controllers 304 and 305 execute a wide variety of controls for the SAS. For example, the SAS controller 304 controls communications with the SAS expander 250 in the local controller module 40a (40b), while the SAS controller 305 controls communications with the SAS expander 250 in the remote controller module 40b (40a).

In other words, the storage control apparatus 30 in the controller module 40a is configured to be connectable to both the SAS expander 250 in the controller module 40a having the storage control apparatus 30 provided therein and the SAS expander 250 in the remote controller module 40b. Similarly, the storage control apparatus 30 in the controller module 40b is configured to be connectable to both the SAS expander 250 in the controller module 40b having the storage control apparatus 30 provided therein and the SAS expander 250 in the remote controller module 40a.

Further, the controller enclosure 2 is configured to be connectable to a drive enclosure which is not illustrated via wide links 70. In other words, multiple drive enclosures are connected to the SAS expander 250 in the controller module 40a and the SAS expander 250 in the controller module 40b in the controller enclosure 2, via the wide links 70, a cascade manner. The drive enclosure is an apparatus that includes one or more HDDs 60 and makes storage areas in the HDDs 60 available.

The processor 301 executes a wide variety of calculations and controls, and embodies various functions of the storage system 1 by executing the control program 303 stored in the memory 302.

For example, the processor 301 implements various functions as a well-known RAID controller, such as implementation of an RAID, access controls to the HDDs 60 in response to a host I/O from the upper-level apparatus 4.

In the storage system 1, the storage control apparatus 30 also has an abnormality detection function that detects abnormalities in the HDDs 60.

Specifically, the processor 301 functions as a command issuing unit 21, a timeout time setting unit 10, and an abnormality detector 22, which will be described later, by executing the reference time setting program 306.

The programs (the control program 303 and the reference time setting program 306) for implementing these functions are provided in the form of programs recorded on a computer readable recording medium, such as, for example, a flexible disk, a CD (e.g., CD-ROM, CD-R, CD-RW), a DVD (e.g., DVD-ROM, DVD-RAM, DVD-R, DVD+R, DVD-RW, DVD+RW), a magnetic disk, an optical disk, a magneto-optical disk, or the like. The computer then reads a program from that storage medium and uses that program after transferring it to the internal storage apparatus or external storage apparatus or the like. Alternatively, the program may be recoded on a storage device (storage medium), for example, a magnetic disk, an optical disk, a magneto-optical disk, or the like, and the program may be provided from the storage device to the computer through a communication path.

Upon embodying the functions as command issuing unit 21, timeout time setting unit 10, and abnormality detector 22, programs stored in internal storage apparatuses (the memory 302 in the storage control apparatus 30) are executed by a microprocessor of the computer (the processor 301 in his embodiment). In this case, the computer may alternatively read a program stored in the storage medium for executing it.

Note that, in the present embodiment, the term "computer" may be a concept including hardware and an operating system, and may refer to hardware that operates under the control of the operating system. Alternatively, when an application program alone can make the hardware to be operated without requiring an operating system, the hardware itself may represent a computer. The hardware includes at least a microprocessor, e.g., CPU, and a means for reading a computer program recorded on a storage medium and, in the present embodiment, the storage control apparatus 30 includes a function as a computer.

The command issuing unit 21 issues a command accompanied by a disk access (hereinafter, simply referred to as a command), to an HDD 60 as a command target storage, based on a host I/O from the upper-level apparatus 4. Note that the function as the command issuing unit 21 can be embodied by means of a wide variety of known techniques, and the descriptions therefor are omitted.

Hereinafter, an HDD 60 to which the command issuing unit 21 issues a command while the storage system 1 operates may also be referred to as a command target HDD 60.

The abnormality detector 22 detects an abnormality (error) in an HDD 60. The abnormality detector 22 measures a response time (command completion time) between the time when the command issuing unit 21 issues a command to an HDD 60 and the time when the HDD 60 returns a response to that command. The abnormality detector 22 then compares the response time to the timeout time, and detects an abnormality as a timeout error in that HDD 60 when the response time exceeds the timeout time.

In the storage system 1, the abnormality detector 22 detects an abnormality related to an issue of a command to the HDDs 60, based on a timeout time (reference time) calculated by the timeout time setting unit 10, which will be described later.

The timeout time setting unit (reference time calculator) 10 sets a timeout time Tout which is used by the abnormality detector 22 as a reference for detecting an abnormality. The timeout time setting unit 10 sets the timeout time Tout when the storage system 1 is started (powered on), or when the HDDs 60 are mounted.

The timeout time setting unit 10 sets a timeout time Tout for each type of the HDDs 60.

In the storage system 1, a command delay time is not necessarily calculated for every HDD 60 since HDDs 60 in the same types are used (e.g., the HDD 60-2 and the HDD 60-4). For this reason, the timeout time setting unit 10 selects some test target HDDs 60 for each type, and calculates a timeout time Tout that is common to the HDDs 60 in that type using these test target HDDs 60.

In other words, the timeout time setting unit 10 sets a timeout time Tout for each type.

As depicted in FIG. 1, the timeout time setting unit 10 includes a storage selector 11, a medium error status generator 12, a command delay time measurement unit 13, a response interval measurement unit 14, a timeout time calculator 15, a total average response interval calculator 16, a reference time modifier 17, an on-error command delay time measurement unit 18, an on-error command delay time calculator 19, an average connection count calculator 24, a response delay coefficient calculator 25, and an operation response interval calculator 26.

The storage selector 11 selects test target HDDs (storage apparatuses to be examined) 60, that are to be test targets for determining the timeout time Tout, from the HDDs 60 of multiple types, when the storage control apparatus 30 is started or when the HDDs 60 are mounted. In other words, the storage selector 11 selects test target HDDs 60 for each HDD type, from all of the HDDs 60 provided in the storage system 1.

Hereinafter, the timing when where a startup process is executed in the storage control apparatus 30, such as when the storage control apparatus 30 is powered on or restarted, or when the HDDs 60 are mounted, for example, is simply referred to as "upon a startup".

When the storage system 1 includes multiple HDDs 60 in the same type, the storage selector 11 selects a certain number of test target HDDs 60 from the HDDs 60 in that type.

In other words, the storage selector 11 selects a certain number of test target HDDs 60 for each type. Note that the number of test target HDDs 60 to be selected for each type is desirably determined in advance.

The medium error status generator 12 causes a medium error in the test target HDDs 60 selected by the storage selector 11. The medium error status generator 12 causes a medium error in the test target HDDs 60 by destroying data (data destruction) stored in a certain sector, as a check code, in the test target HDDs 60, for example. Note that the data destruction in the check code may be implemented using various techniques well-known in the art, and the detailed descriptions thereof will be omitted for simplicity. Hereinafter, the situation where an HDD 60 has no error status is referred to as a "without any medium error".

The medium error status generator 12 can also overcome the generated medium error status by overwriting the check code of which data has been destroyed, with a correct check code, for example.

Once the command delay time measurement unit 13, which will be described later, completes measurements of an on-medium error command delay time tavg, the medium error status generator 12 overcomes the medium error status to generate a medium error free status (normal status).

The command delay time measurement unit 13 makes the command issuing unit 21 issue a test command (first test command) to the HDDs 60 wherein the medium error status generator 12 causes the medium error.

The command delay time measurement unit 13 then measures the time (response time) between when the test command is issued and the time when an error response (command response) for that test command is returned from the HDD 60, as an on-medium error command delay time tavg. Hereinafter, the on-medium error command delay time tavg may be simply referred to as a command delay time tavg.

More specifically, the command delay time measurement unit 13 issues a test command to the test target HDDs 60 in which the medium error status generator 12 causes the medium error, and measures the time (delay time) required for a command response to that test command, as an on-medium error command delay time tavg.

The on-medium error command delay time tavg represents the intrinsic capability of an HDD 60 for response upon a medium error, such as a retry count and a disk access speed in that HDD 60.

The command delay time measurement unit 13 uses a non-illustrated timer, for example, upon measuring a command delay time tavg.

The response interval measurement unit 14 puts a higher load on the test target HDDs 60 without any medium error selected by the storage selector 11, when the storage control apparatus 30 is started, by making the command issuing unit 21 issue multiple commands to these HDDs 60.

Here, the higher load status is the situation where the data transfer amount per unit time (e.g., one second) is saturated between the storage control apparatus 30 and an HDD 60.

In other words, specifically, the response interval measurement unit 14 issues multiple pieces of input/output data on a bus connected to a test target HDD 60, until the data transfer amount per second to that HDD 60 is saturated.

Under a higher load status caused in such a manner, the response interval measurement unit 14 makes the command issuing unit 21 generate multiple test commands (second test commands) to the test target HDDs 60 without any medium error. The response interval measurement unit 14 then measures respective intervals of command responses for these multiple test commands, as response intervals (response intervals) tr.

Note that the response intervals tr are intervals between respective command responses (responses) made by an HDD 60, when the HDD 60 is in a medium error free status (normal status) and a higher load status, and when multiple commands are issued to the HDD 60.

Figure 6:
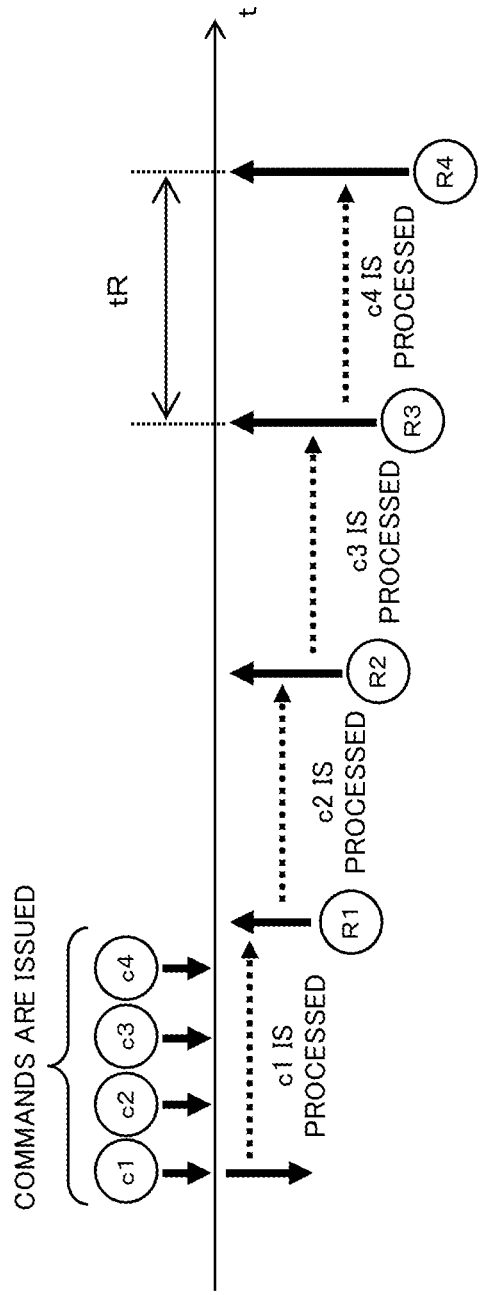
FIG. 6 is a diagram illustrating response intervals in a storage system as one example of an embodiment.

FIG. 6 is a diagram illustrating response intervals in the storage system 1 as one example of an embodiment.

Commands issued by the command issuing unit 21 are sent to HDDs 60 via the SAS expander 250 and the like. In that HDD 60, the received command is stored in a queue. In the example depicted in FIG. 6, four commands, namely, Commands c1 to c4, are issued.

In the HDD 60, a single command is processed at a time, and thus Commands c1 to c4 stored in the queue are sequentially processed. Every time one command has been processed, the HDD 60 makes a command response to the storage control apparatus 30.

In the example depicted in FIG. 6, in the HDD 60, after Command c1 obtained from the queue is processed and then Response R1 is sent, Command c2 is processed and Response R2 is sent. Similarly, after Command c3 is processed and then Response R3 is sent, Command c4 is processed and Response R4 is sent.

In the present embodiment, the "response interval" refers to the interval between the time when a previous response is received from an HDD 60, and the time when a next command is processed in that HDD 60 and a response to the processed command is received (see "tR" in FIG. 6).

By measuring such a response interval, the time required by the HDD 60 to process a single command can be obtained. In the present embodiment, the HDDs 60 have a queuing function to sequentially process commands stored in the queue. This prevents response intervals being affected by intervals of issuance of commands.

Further, during the system operation after the storage control apparatus 30 is started, the response interval measurement unit 14 calculates the average response interval R that is an average of response intervals for each HDD 60, when the command issuing unit 21 issues commands to the HDDs 60. The calculated average response interval R for each HDD 60 is stored in the disk information T2 described above.

The timeout time calculator (reference time calculator) 15 calculates a timeout time Tout for each HDDs 60 of multiple types.

Specifically, the timeout time calculator 15 calculates the timeout time Tout based on the following Formula (1):

$$\text{Timeout time } Tout = \text{command delay time } tavg + \text{response interval } tr \quad (1)$$

In a storage system, the time required to process a single command can be represented by a sum of the "time to transfer data of a command" and the "time to process (read/write) the command for an HDD 60".

Here, the maximum delay time of the "time to process (read/write) the command for an HDD 60" is determined as a "command delay time tavg upon a forced medium error".

Further, the maximum delay time of "time to transfer data of a command" is determined as the "response interval tr without any medium error under a higher load".

Hence, when no response is received from an HDD 60 after the time interval, which is sum of the "command delay time tavg upon a forced medium error" and the "response interval tr in a normal status under a higher load", passes, that HDD 60 can be determined as an erroneous HDD 60.

The timeout time calculator 15 calculates the timeout time Tout as an initial value when the storage control apparatus 30 is started. The timeout time calculator 15 calculates the timeout time Tout every time a command is issued to a target HDD 60 from the command issuing unit 21 during an operation of the storage system 1, after the storage control apparatus 30 has been started. The timeout time calculator 15 also calculates the timeout time Tout when a medium error occurs in an access to an HDD 60 during an operation of the storage system 1 operates.

The total average response interval calculator 16 calculates the average of response intervals of all buses to the multiple HDDs 60 provided in the storage system 1, as an average response interval (total average response interval) Ravg. The total average response interval calculator 16 calculates the average of response intervals for all of the buses to all of the HDDs 60 in the storage system 1 when the command issuing unit 21 issues a command to an HDD 60 during an operation of the storage system 1. The total average response interval calculator 16 then stores the calculated average response interval for all of the buses Ravg in the bus information D3.

The average connection count calculator 24 calculates the total data amount/command count dpc when the command issuing unit 21 issues a command to a command target HDD 60 during an operation of the storage system 1.

Specifically, the average connection count calculator 24 calculates the total data amount/command count dpc by dividing the data size sent and received between the storage control apparatus 30 and its HDDs 60 by the total command count sent and received between the storage control apparatus 30 and its HDDs 60. In other words, the total data amount/command count dpc represents the average data size per command.

In the present embodiment, the data size is represented in a unit of block, the total data amount/command count dpc may also be represented as the command average block count dpc.

Note that the unit of data sizes is not limited to a block and bits may be used, for example, and a wide variety of variations are possible.

Further, the average connection count calculator 24 obtains the average connection count per command C of a command target HDD 60. Specifically, the average connection count calculator 24 calculates the average connection count C based on the following Formula (2):

$$\text{Average connection count } C = (\text{total data size/command count } dpc)/\text{burst length bl} \qquad (2)$$

For calculating the average connection count C, the total data amount/command count dpc corresponding to an HDD 60 of interest and the burst length bl are used, in the disk information D2.

Further, the average connection count calculator (total average connection count calculator) 24 calculate the average of average connection count per commands C of all of the HDDs 60 provided in the storage system 1. Hereinafter, the average of the average connection count per commands C of all of the HDDs 60 provided in the storage system 1 is referred to as the average connection count of all HDDs.

The response delay coefficient calculator 25 calculates the response delay coefficient DK during an operation of the storage system 1. The response delay coefficient calculator 25 calculates the response delay coefficient (response delay coefficient) DK, based on the average connection count C of a command target HDD 60, and the average connection count of all HDDs 60 connected to the storage control apparatus 30.

Specifically, the response delay coefficient calculator 25 calculates the response delay coefficient DK using the following Formula (3):

$$\text{Response delay coefficient } DK = (\text{average connection count } C \text{ of command target HDD})/(\text{average connection count of all HDDs}) \qquad (3)$$

The operation response interval calculator 26 calculates an expected response interval (operation response interval) by applying (multiplying) the response delay coefficient calculator 25 obtained by the response delay coefficient DK to the average response intervals (total average response intervals) Ravg of all buses calculated by the total average response interval calculator 16 (see Formula (4)).

$$\text{Expected response interval } tr = \text{average response interval for all buses } Ravg * \text{response delay coefficient } DK \qquad (4)$$

The on-error command delay time measurement unit 18 measures, when an actual medium error occurs in a command target HDD 60 during an operation of the storage system 1, the delay time of a response to that command, as an on-error command delay measured time Terror.

The storage control apparatus 30 fundamentally includes a function to measure a response time to a command, when the commend is issued to an HDD 60. The on-error command delay time measurement unit 18 obtains, when a medium error is detected by the abnormality detector 22, a command response time of a command related to the detected error, as an on-error command delay measured time Terror.

In other words, the on-error command delay measured time Terror is a response time between the time when a command related to a medium error is issued upon detection of the medium error and the time when an error response (command response) for that command is returned from the HDD 60.

The on-error command delay time calculator 19 calculates an on-error command delay time Tavg', based on the on-error command delay measured time Terror measured by the on-error command delay time measurement unit 18, and the command delay time tavg measured by the command delay time measurement unit 13.

Specifically, the on-error command delay time calculator 19 calculates the on-error command delay time Tavg' using the following Formula (5):

$$\text{On-error command delay time } Tavg' = (\text{on-error command delay measured time } Terror + \text{command delay time } tavg)/2 \qquad (5)$$

The calculated on-error command delay time Tavg' is stored in a certain region in the memory 302, for example.

The reference time modifier 17 calculates the timeout time Tout by using the expected response interval calculated by the operation response interval calculator 26, as a response interval tr in the above-described Formula (1).

Specifically, the reference time modifier 17 calculates (modifies) a new timeout time Tout for a command target HDD 60 by adding the expected operation the response interval tr to the command delay time tavg, every time the command issuing unit 21 issues a command during an operation of the storage system 1.

Further, the reference time modifier 17 calculates, when a medium error is detected by the abnormality detector 22 during an operation of the storage system 1, a new timeout time Tout for an HDD 60 where the medium error is detected, by using the on-error command delay time Tavg' calculated by the on-error command delay time calculator 19 as a new command delay time, and adding that new command delay time Tavg' to the response interval tavg.

In other words, the reference time modifier 17 calculates a new timeout time Tout for a command target HDD 60 where the error is detected.

The reference time modifier 17 sets the newly calculated timeout time Tout, as a timeout time of the command target HDD 60.

Figure 7:
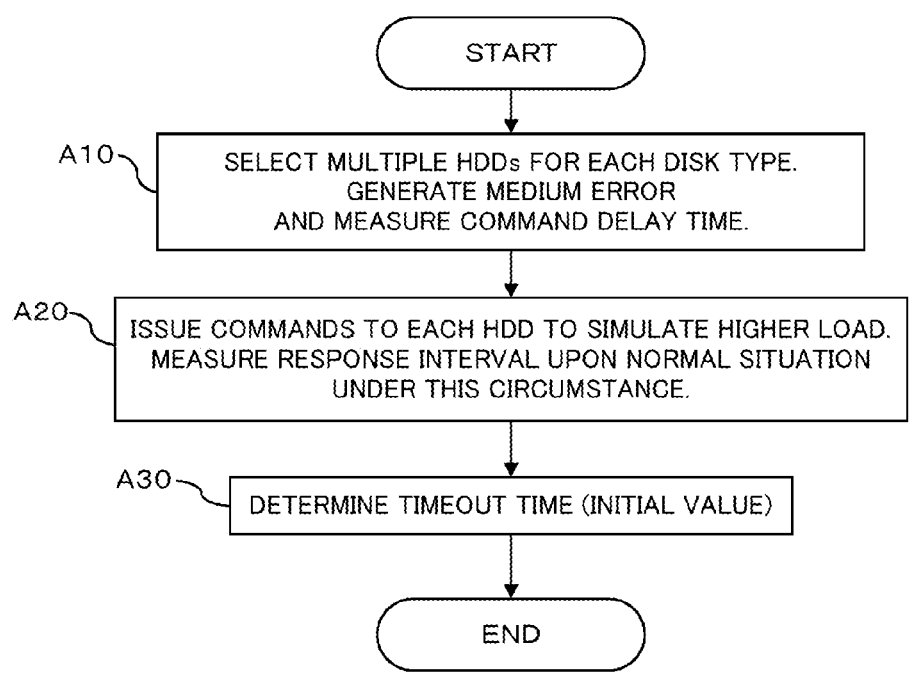
FIG. 7 is a flowchart illustrating calculation of a timeout time when a storage system as one example of an embodiment is being started.

A calculation of a timeout time upon a startup of the storage system 1 configured as described above as one example of an embodiment will be described with reference to the flowchart depicted in FIG. 7 (Steps A10-A30).

After a controller enclosure 2 is powered on and a controller module 40 is also powered on, power is thus supplied to a storage control apparatus 30. In response, a startup operation of the storage control apparatus 30 is initiated.

In the storage control apparatus 30, an on-medium error command delay time tavg is measured (Step A10).

Specifically, initially, the storage selector 11 selects a test target HDD 60 (storage apparatus to be examined) 60 that is to be tested to determine the timeout time Tout from each type of HDDs 60 of multiple types.

Next, the medium error status generator 12 generates a medium error in the test target HDD 60 by destroying data stored as a check code in the selected storage apparatuses 60 to be examined. The command issuing unit 21 then issues a test command for causing a data access, to the HDDs 60 where the medium error was generated by the medium error status generator 12. The command delay time measurement unit 13 measures a on-medium error command delay time tavg in the test target HDD 60, based on a response to that test command.

Thereafter, the medium error status generator 12 recovers from the generated medium error to generate a medium error free status (normal status).

Next, a response interval tr is measured in the test target HDDs 60 in the medium error free state, selected by the storage selector 11 (Step A20).

Specifically, initially, command issuing unit 21 puts the test target HDDs 60 without any medium error selected by the storage selector 11 into a higher load status, by issue multiple commands to these HDDs 60.

Further, the command issuing unit 21 further issues multiple test commands (second test commands) to these test target HDDs 60 in a higher load status. The respective intervals of command responses for these multiple test commands are measured as response intervals tr.

The timeout time calculator 15 calculates an initial value of the timeout time, by adding the on-medium error command delay time tavg obtained at Step A10 to the response interval tr obtained at Step A20 (Step A30).

Figure 8:
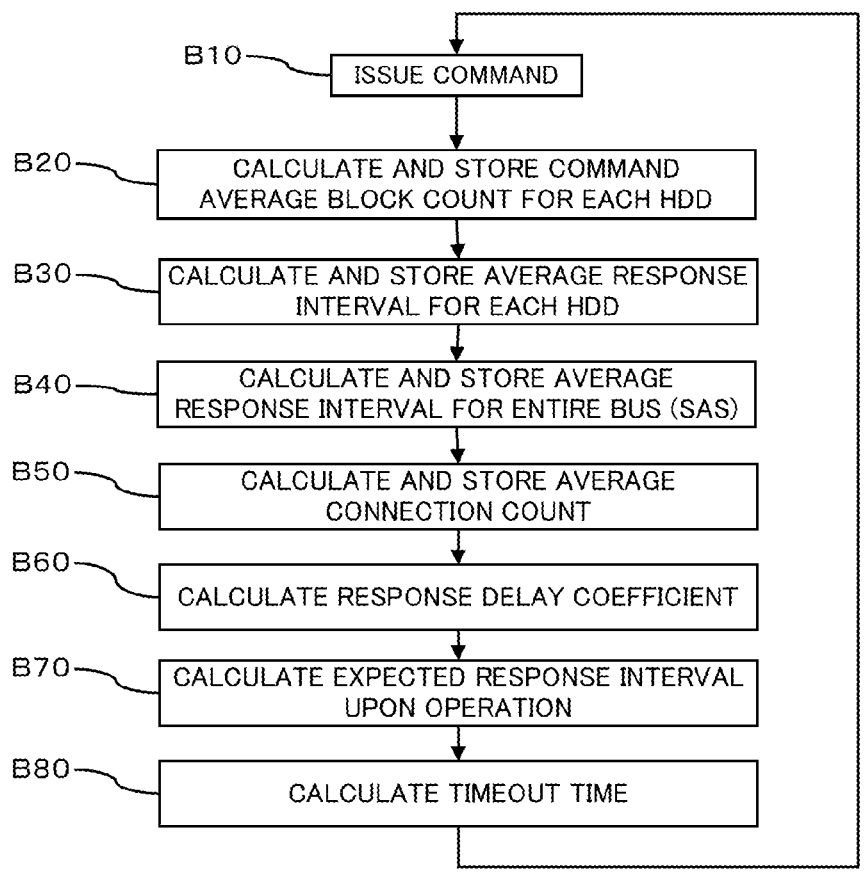
FIG. 8 is a flowchart illustrating calculation of a timeout time when a storage system as one example of an embodiment operates.

Next, a calculation of a timeout time during an operation of the storage system 1 configured as described above as one example of an embodiment will be described with reference to the flowchart depicted in FIG. 8 (Steps B10-B80).

During an operation of the storage system 1, values in disk information D2 and bus information D3 are sequentially updated using the values calculated by the timeout time setting unit 10, and the value of the timeout time Tout is also updated where appropriate.

In this example, it is assumed that the burst length bl-A of Disk Type A is 10, the burst length bl-B of Disk Type B is 20, and the burst length bl-C of Disk Type C is 30.

In this example, it is also assumed that the command issuing unit 21 sequentially issues commands for 40 (blocks) Read, 20 (blocks) Read, 20 (blocks) Read, 40 (blocks) Read, in this order, to the HDD 60-2 (Disk B). Similarly, it is also assumed that the command issuing unit 21 sequentially issues commands for 30 (blocks) Read, 30 (blocks) Read, and 30 (blocks) Read, in this order, to the HDD 60-3 (Disk Type C). It is further assumed that the command issuing unit 21 sequentially issues commands for 100 (blocks) Read, and 20 (blocks) Read, in this order, to the HDD 60-4 (Disk Type B).

When the command issuing unit 21 issues a command to the command target HDDs 60 (Step B10), the average connection count calculator 24 calculates the command average block count dpc of each HDD 60 (Step B20).

Specifically, the average connection count calculator 24 calculates the total data amount/command count dpc, i.e., the command average block count dpc, by dividing the total data amount of commands issued from the storage control apparatus 30 to an HDD 60, by the total command count issued to that HDD 60.

(a) Disk 2:
Total data amount of commands issued to Disk 2=120 (blocks)
Command count=4

Command average block count to Disk 2 $dpc\text{-}2$=total data amount of commands issued to Disk 2/command count=120/4=30 (blocks)

(b) Disk 3:
Total data amount of commands issued to Disk 3=90 (blocks)
Command count=3

Command average block count to Disk 3 $dpc\text{-}3$=total data amount of commands issued to Disk 2/command count=90/3=30 (blocks)

(c) Disk 4:
Total data amount of commands issued to Disk 4=120 (blocks)
Command count=2

Command average block count to Disk 2 $dpc\text{-}4$=total data amount of commands issued to Disk 2/command count=120/2=60 (blocks)

The command average block count dpc for each HDD 60 calculated as described above is stored in the disk information D2. In other words, the total data amount/command count dpc in the disk information D2 is overwritten and updated with the newly calculated total data amount/command count dpc.

Next, the response interval measurement unit 14 calculates the average response interval R for each HDD 60 (Step B30).
(a) Disk 2:
If the response intervals are as follows:
Response interval between the first command response and the second command response=2 (seconds)
Response interval between the second command response and the third command response=2 (seconds)
Response interval between the third command response and the fourth command response=5 (seconds)

Average response interval $R\text{-}2$=(2+2+5)/3=3 (seconds)

(b) Disk 3:
If the response intervals are as follows:
Response interval between the first command response and the second command response=3 (seconds)
Response interval between the second command response and the third command response=2 (seconds)

Average response interval $R\text{-}3$=(3+4)/2=3.5 (seconds)

(c) Disk 4:
If the response interval is as follows:
Response interval between the first command response and the second command response=2.5 (seconds)

Average response interval R-4=2.5 (seconds)

The average response interval R for each HDD 60 calculated as described above is also stored in the disk information D2. In other words, the average response interval R in the disk information D2 is overwritten and updated with the newly calculated average response interval R.

Next, the total average response interval calculator 16 calculates the average response interval of all buses (total average response interval) Ravg of all of the buses to the multiple HDDs 60 provided in the storage system 1 (Step B40).
In this example, Response interval of all buses $R\text{avg}$=(3+3.5+2.5)/3=3 (seconds)

Further, the response interval of all buses Ravg calculated as described above is stored in the bus information D3. In other words, the response interval Ravg in the bus information D3 is overwritten and updated with the newly calculated response interval Ravg.

Next, the average connection count calculator 24 calculates the average connection count per command C for each HDD 60 (Step B50).

(a) Disk 2:

Average connection count $C$-2 of Disk 2=(total data amount/command count $dpc$-2)/burst length $bl$-2=(120/4)/20=1.5

(b) Disk 3:

Average connection count $C$-3 of Disk 3=(total data amount/command count $dpc$-3)/burst length $bl$-3=(90/3)/30=1

(c) Disk 4:

Average connection count $C$-4 of Disk 2=(total data amount/command count $dpc$-4)/burst length $bl$-4=(120/2)/20=3

Further, the average connection count C calculated as described above is stored in the disk information D2 while being related to that HDD 60. In other words, the average connection count C in the disk information D2 is overwritten and updated with the newly calculated average connection count C.

Further, the response delay coefficient calculator 25 calculates the response delay coefficient DK for each HDD 60 (Step B60)

Note that the average connection count of all HDDs is (1.5+1+3)/3.

(a) Disk 2:

Response delay coefficient of Disk 2 $DK$-2=Average connection count of Disk 2 $C$-2/Average connection count of all HDDs=1.5/((1.5+1+3)/3)≈0.82

(b) Disk 3:

Response delay coefficient of Disk 2 $DK$-3=Average connection count of Disk 3 $C$-3/Average connection count of all HDDs=1/((1.5+1+3)/3)≈0.55

(c) Disk 4:

Response delay coefficient of Disk 4 $DK$-4=Average connection count of Disk 4 $C$-2/Average connection count of all HDDs=3/((1.5+1+3)/3)≈1.64

Further, the response delay coefficient DK calculated as described above is stored in the disk information D2 while being related to that HDD 60. In other words, the response delay coefficient DK in the disk information D2 is overwritten and updated with the newly calculated response delay coefficient DK.

The operation response interval calculator 26 calculates an expected response interval tr (Step B70).

(a) Disk 2:

Response interval of Disk 2 $tr$-2=Average response interval of all buses $Ravg$*Response delay coefficient $DK$-2=3 (s)*0.82=2.46 (s)

(b) Disk 3:

Response interval of Disk 3 $tr$-3=Average response interval of all buses $Ravg$*Response delay coefficient $DK$-3=3 (s)*0.55=1.65 (s)

(c) Disk 4:

Response interval of Disk 4 $tr$-4=Average response interval of all buses $Ravg$*Response delay coefficient $DK$-4=3 (s)*1.64=4.92 (s)

Further, the expected response interval tr calculated as described above is stored in the disk information D2, as a new response interval tr, while being related to that HDD 60. In other words, the response interval tr in the disk information D2 is overwritten and updated with the newly calculated expected response interval tr.

The reference time modifier 17 calculates a new timeout time Tout by using the expected response interval calculated by the response delay coefficient calculator 25, as a response interval tr in the above-described Formula (1) (Step B80).

As an example, it is assumed that the command delay time tavg-A is 3 (s), the command delay time tavg-B is 4 (s), and the command delay time tavg-C is 5 (s).

(a) Disk 2:

Timeout time of Disk 2 $Tout$-2=command delay time $tavg$-$B$+response interval $tr$-2=4+2.46=6.46 (s)

(b) Disk 3:

Timeout time of Disk 3 $Tout$-3=command delay time $tavg$-$C$+response interval $tr$-3=5+1.65=6.65 (s)

(c) Disk 4:

Timeout time of Disk 4 $Tout$-4=command delay time $tavg$-$B$+response interval $tr$-4=4+4.92=8.92 (s)

Each of the calculated timeout time Tout is stored in the disk information D2 while being related to that HDD 60. In other words, the timeout times Tout in the disk information D2 are overwritten and updated with the newly calculated timeout times Tout.

The abnormality detector 22 then refers to the disk information D2 of the HDD 60 to which the command is issued, and detects any timeout error by comparing the command completion time with the timeout time Tout of that HDD 60. In other words, when command completion time exceeds the timeout time Tout, a timeout error is detected and an abnormality in that HDD 60 is also detected.

In the example set forth above, the detection of a timeout error in Disk 4 requires 8.92 (s), while the detection of a timeout error in Disk 3 can be detected in 6.65 (s).

Figure 9:
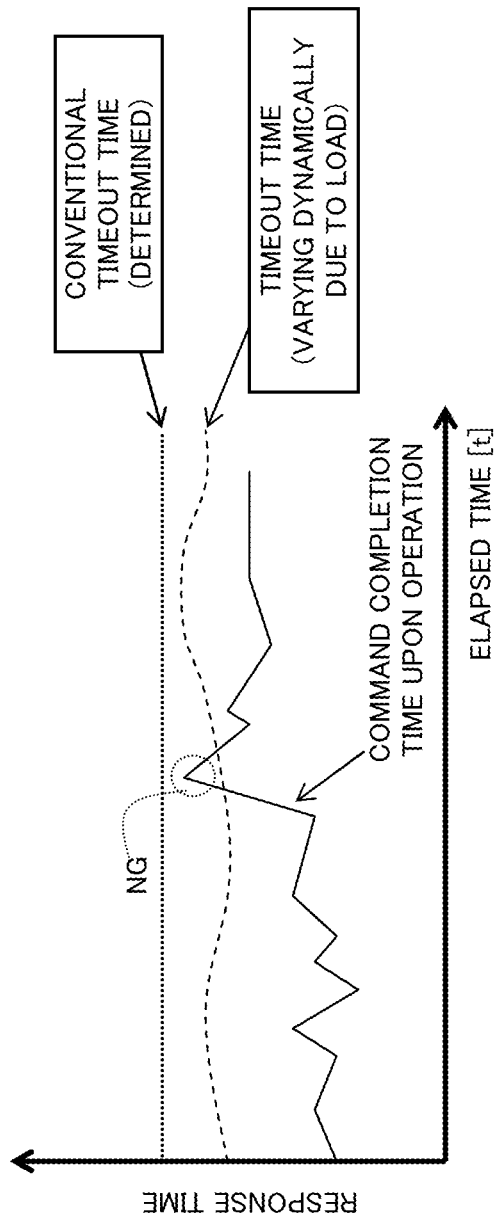
FIG. 9 is a diagram illustrating a timeout time in a storage system as one example of an embodiment.

FIG. 9 is a diagram illustrating a timeout time in the storage system 1 as one example of an embodiment. In the example depicted in FIG. 9, the timeout time calculated by the reference time modifier 17, the command completion time, and the timeout time set with a conventional technique are depicted.

In the storage system 1, the calculated timeout time dynamically varies due to the load of the HDD 60, as depicted in FIG. 9. The abnormality detector 22 determines that an abnormality occurs when the abnormality detector 22 detects that the command completion time is greater than the timeout time (refer to NG in FIG. 9).

Further, as depicted in FIG. 9, the timeout time in the storage system 1 is smaller than a timeout time in conventional techniques, which is determined upon the maximum load on the propagation path and is a fixed value. In the storage system 1, the timeout time can be set to a value smaller than that in the conventional techniques, and hence, the abnormality detector 22 can swiftly detect errors.

Figure 10:
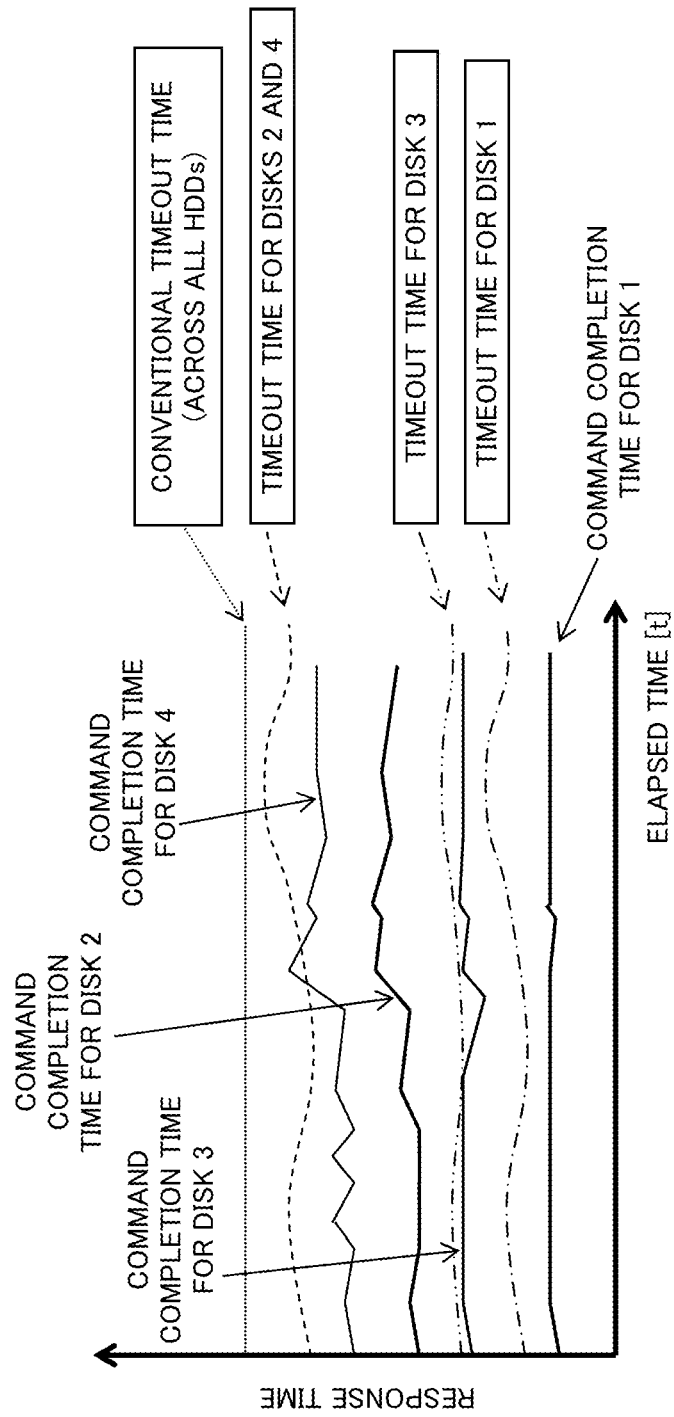
FIG. 10 is a diagram illustrating timeout times set for each of the multiple disk types in a storage system as one example of an embodiment.

FIG. 10 is a diagram illustrating timeout times set for each of the multiple disk types in the storage system 1 as one example of an embodiment. In the storage system 1, as depicted in FIG. 10, respective timeout times are set to Disks 1 to 4. Note that, in the example depicted in FIG. 10, Disk 2 and Disk 4 are of the same type, and have the common timeout time.

As described above, by setting an appropriate timeout time to each type, errors can be detected more precisely than conventional techniques where a single timeout time to all disks, and further errors can be swiftly detected for each type. In other words, errors can be detected efficiently.

Figure 11:
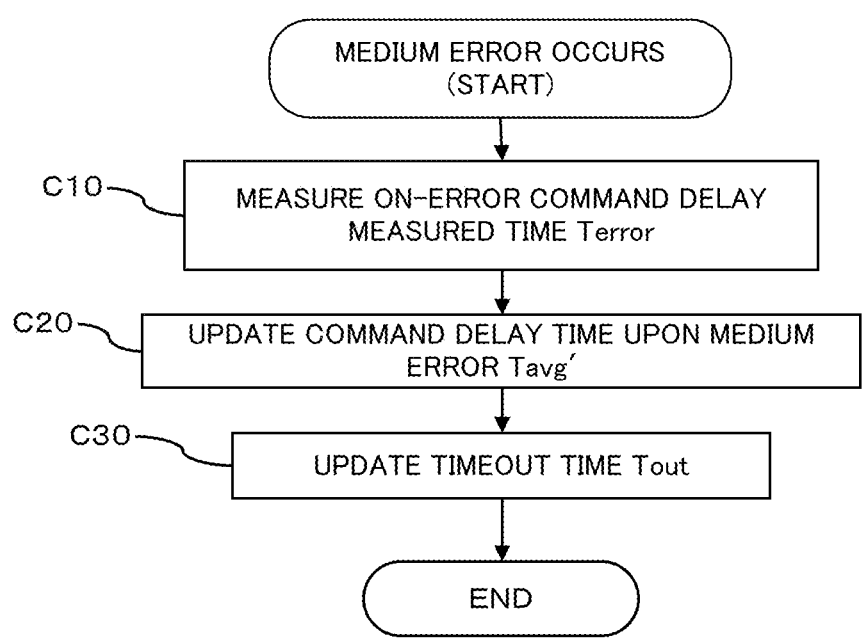
FIG. 11 is a flowchart illustrating calculation of a timeout time when an error is detected while a storage system as one example of an embodiment operates.

Next, a calculation of a timeout time when a medium error is detected during an operation of the storage system 1 configured as described above as one example of an embodiment will be described with reference to the flowchart depicted in FIG. 11 (Steps C10-C30).

the on-error command delay time measurement unit 18 measures, when an actual medium error occurs in a command target HDD 60 during an operation of the storage system 1, the delay time of a response to that command, as an on-error command delay measured time Terror (Step C10).

Thereafter, the on-error command delay time calculator 19 calculates an on-error command delay time Tavg', based on the on-error command delay measured time Terror measured by the on-error command delay time measurement unit 18, and the command delay time tavg measured by the command delay time measurement unit 13 (Step C20).

Then, the reference time modifier 17 calculates a new timeout time Tout for an HDD 60 where the medium error is detected, by using the on-error command delay time Tavg' calculated by the on-error command delay time calculator 19 as a command delay time in the above-described Formula (1) (Step C30).

In other words, the following stands:

Timeout time *T*out of a command target HDD 60 where the error is detected=command delay time *T*avg'+the response interval *tr*

The newly calculated timeout time Tout is stored in the disk information D2. In other words, the timeout time Tout in the disk information D2 is overwritten and updated.

The abnormality detector 22 then refers to the disk information D2 of the HDD 60 to which the command is issued, and detects any timeout error by comparing the command completion time with the new timeout time Tout of that HDD 60.

As described above, in accordance with the storage system 1 as one example of an embodiment, by setting different timeout times Tout to the respective disk types, the time required to detect errors can be reduced. This can improve the processing efficiency in the storage system 1.

Then, by setting the timeout time based on the command completion time upon a medium error and the response interval under a higher load without any medium error, the timeout times can be set in accordance with the processing performances of HDDs 60. In other words, an appropriate timeout time can be set to each HDD 60. When a command completion time is delayed, it can be determined whether the delay is due to the higher load on the propagation path or due to a failure in that HDD 60.

By using the command completion time upon a medium error upon setting the timeout time, the response capabilities unique to an HDD 60, such as the retry count and the access speed in that HDD 60, can be reflected to the decision whether a timeout occurs upon a medium error.

Further, by using the response interval under a higher load without any medium error upon setting the timeout time, only the time required for an actual disk access and the time required for transmission of response data can be reflected, thereby eliminating factors not directly related to the disk performances, such as queue time.

In the present embodiment, the sum of the command completion time upon a medium error and the response interval under a higher load without any medium error is used, as the timeout time. This is because the time required to process a single command can be represented by a sum of the "time to transfer data of a command" and the "time to process (read/write) the command for an HDD 60".

The maximum delay time of the time to process (read/write) the command for an HDD 60 is determined from the command delay time upon a medium error, while the maximum delay time of time to transfer data of a command is determined from the response interval without any medium error under a higher load. When no response has been returned from the HDD 60 after the timeout time, which is the sum of the two, elapses, the abnormality detector 22 can determine that the HDD 60 is experiencing an error.

In other words, the sum of the command completion time upon a medium error and the response interval under a higher load without any medium errors is an optimal timeout time value.

Further, every time a command is issued from the storage control apparatus 30 during an operation of the storage system 1, the reference time modifier 17 dynamically modifies the timeout time Tout in accordance of the data transfers on the bus. Thereby, the timeout time is suitably set for the data transfers on the bus, which can eliminate any effects of data delay due to the load on the propagation path to reliably and immediately determine that an error occurs in the HDD 60.

In other words, an optimal timeout time Tout is set in accordance with the load on the propagation path which varies dynamically during an operation of the system, enabling an efficient operation of the system.

Further, during an operation of the storage system 1, when a medium error is detected, any command completion delay due to a medium error is reflected to the timeout time by the on-error command delay time measurement unit 18 and the on-error command delay time calculator 19. In other words, the average of the delay time used during an operation of the system and the actual command completion delay time upon the medium error is calculated and used for calculation of the timeout time. Thereby, the longer the storage system 1 operates, the more appropriate the timeout time Tout can be set for the system usage, which can achieve an efficient system operation.

Further, upon a startup, by measuring the delay time of a command response upon a medium error and using the delay time to set the timeout time, the performances of the HDDs 60 to recover from the medium error (to retry) can be set to the timeout time. In other words, a timeout time suitable for the performances of the HDDs 60 can be set.

Further, every time a command is issued from the storage control apparatus 30 during an operation of the system, the reference time modifier 17 dynamically modifies the timeout time Tout in accordance of the data transfers on buses. Thereby, the timeout time is suitably set for the data transfers on the bus, which can eliminate any effects of data delay due to the load on the propagation path to reliably and immediately determine that an error occurs in the HDD 60.

Further, in the storage system 1, a delay time is not determined for every HDD 60 provided in the system, but is determined for a certain number HDDs 60 of each type. In other words, the effective processing is achieved by using a common timeout time for HDDs 60 in the same type.

Still, by selecting multiple test target HDDs 60 for each type and determining their average delay time, the storage selector 11 can determine an approximate delay time of that type.

The storage selector 11 may select a single test target HDD 60 for each type. However, in such a case, the selected HDD 60 may have a failure. In this case, an abnormal timeout time may be calculated. In order to avoid this, preferably, multiple test target HDDs 60 is determined for each type and their average delay time is calculated for later use.

If a delay time of one HDD 60 in the multiple HDDs 60 significantly deviates from delay times of the other HDDs 60 (for example, the deviation is 50% or greater), preferably, that HDD 60 is omitted from the test target HDDs 60 and the storage selector 11 selects another HDD 60.

Further, preferably, the storage selector 11 selects test target HDDs 60, taking the distances on the bus from the upper-level apparatus 4 into account. For example, it is preferred that the storage selector 11 selects both HDDs 60 connected to a device enclosure closer on the bus to the upper-level apparatus 4 and HDDs 60 connected to a device enclosure farther on the bus from the upper-level apparatus 4. This can help to reduce any deviation due to difference of the distances from the upper-level apparatus 4, thereby improving the system reliability.

In the storage system 1, the response interval measurement unit 14 puts a higher load on the test target HDDs 60 without any medium error selected by the storage selector 11, when the storage control apparatus 30 is started, by making the command issuing unit 21 issue multiple commands to these HDDs 60.

Here, the timeout time is used to detect errors in the HDDs 60 (to isolate the errors). When the load on the bus increases, a command completion is delayed due to the load even when no medium error occurs in an HDD 60. The higher the load becomes, the more significant the delay of the command completion becomes.

Therefore, if a timeout time was set by messing the response interval of the HDD 60 in the normal state (without any medium error) which is not under a higher load, it would be mistakenly determined that the normal HDD 60 is defective. To avoid such a situation, in the storage system 1, the response interval measurement unit 14 puts a higher load on the HDDs 60.

The disclosed technique is not limited to the embodiment described above, and various modifications may be made without departing from the spirit of the present embodiment.

For example, while the storage apparatuses are the HDDs 60 in the embodiment described above, this is not limiting and other types of storage, such as solid state drives (SSDs), may be used, for example.

Further, while four HDDs 60 are provided in the storage system 1 in the embodiment described above, this is not limiting. Fewer or more HDDs 60 may be provided and a wide variety of variations are possible without departing from the scope and spirit of the embodiment. For example, additional HDDs 60 may be provided in one or more drive enclosures connected through the wide link 70.

Further, while there are three types of HDDs 60, namely, Types A, B, and C, in the embodiment described above, this is not limiting and fewer or more types of HDDs 60 may be used.

The embodiment may be practiced or manufactured by those ordinary skilled in the art with reference to the above disclosure.

The disclosed technique may provide at least one of the following advantageous effects or advantages:

(1) By calculating a reference time for each type of storage apparatuses, the time required to detect the abnormality can be reduced and thus the processing efficiency can be improved.

(2) Upon calculating the reference time, by measuring the delay time of a command response upon a medium error, the timeout times can be set in accordance with the processing performances of the storage apparatuses.

(3) Upon calculating the reference time, by using the interval of the respective command responses to the plurality of second test command to the storage apparatuses to be examined under a higher load without any medium error, the timeout time can be calculated which only reflects the time required for an actual disk access and the time required for transmission of response data can be reflected, thereby eliminating factors not directly related to the disk performances, such as queue time.

(4) When a command completion time is delayed, it can be determined whether the delay is due to the higher load on the propagation path or due to a failure in a storage apparatus.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A storage control apparatus that is capable of being connected to storage apparatuses of a plurality of types, the storage control apparatus comprising:

a storage apparatus selector that selects storage apparatuses to be examined from each of the plurality of types of the storage apparatuses;

a medium error status generator that generates a medium error status in the storage apparatuses to be examined;

a command delay time measurement unit that issues a first test command while the medium error status generator generates the medium error status, and measures a delay time of a command response for the first test command as a command delay time;

a response interval measurement unit that issues a plurality of second test commands to the storage apparatuses to be examined under a higher load when no error occurs, and measures an interval of each command response for the plurality of second test commands as a response interval;

a reference time calculator that calculates, for each of the plurality of types of the storage apparatuses, a reference time for each storage apparatus type by adding the command delay time and the response interval; and an abnormality detector that detects an abnormality upon issuing a command to the storage apparatuses, based on the reference time calculated by the reference time calculator.

2. The storage control apparatus according to claim 1, wherein the medium error status generator, the storage apparatus selector, the command delay time measurement unit, and the reference time calculator function when the storage control apparatus is being started.

3. The storage control apparatus according to claim 1, further comprising:

a command issuing unit that issues the commands to a command target storage apparatus to which the command is to be issued;

a total average response interval calculator that calculates, when the command issuing unit issues the command to the command target storage apparatus, an average of the response intervals for all of the plurality of storage apparatuses connected to the storage control apparatus, as a total average response interval;

an average connection count calculator that calculates, when the command issuing unit issues the command to the command target storage apparatus, an average connection count per command for the command target storage apparatus;

a total average connection count calculator that calculates an average connection count per command for all of the plurality of storage apparatuses connected to the storage control apparatus;

a response delay coefficient calculator that calculates a response delay coefficient, based on the average connection count for the command target storage apparatus and the average connection count per command for all of the plurality of storage apparatuses connected to the storage control apparatus;

an operation response interval calculator that calculates an operation response interval by applying the response delay coefficient to the total average response interval; and a reference time modifier that calculates a new reference time for the command target storage apparatus by setting the operation response interval calculated by the operation response interval calculator as a new response interval and adding the new response interval and the command delay time, and sets the newly calculated reference time as a reference time for the command target storage apparatus.

4. The storage control apparatus according to claim 3, further comprising, when an error is detected in the command target storage apparatus while the storage control apparatus operates, an on-error command delay time measurement unit that measures a delay time of a command response when the error occurs, as an on-error command delay measured time; and an on-error command delay time calculator that calculates an on-error command delay time calculated based on the on-error command delay measured time, wherein the reference time modifier calculates a new reference time for the command target storage apparatus in which the error is detected by setting the on-error command delay time calculated by the on-error command delay time calculator as the new command delay time, and adding the response interval and the new command delay time.

5. A method of setting a reference time used for detecting, in a storage control apparatus connected to storage apparatuses of a plurality of types, an abnormality when a command is executed to the storage apparatuses, the method comprising:

selecting storage apparatuses to be examined from each of the plurality of types of the storage apparatuses;

generating a medium error status in the storage apparatuses to be examined;

issuing a first test command while generating the medium error status in the storage apparatuses to be examined, and measuring a delay time of a command response for the first test command as a command delay time;

issuing a plurality of second test commands to the storage apparatuses to be examined under a higher load when no error occurs, and measures an interval of each command response for the plurality of second test commands as a response interval; and calculating, for each of the plurality of types of the storage apparatuses, a reference time for each storage apparatus type by adding the command delay time and the response interval.

6. The method of setting a reference time according to claim 5, wherein the generating the medium error status, the selecting the storage apparatuses, the measuring the command delay time, and the calculating the reference time are executed when the storage control apparatus is being started.

7. The method of setting a reference time according to claim 5, further comprising, when a command is issued to a storage apparatus, calculating an average of the response intervals for all of the plurality of storage apparatuses connected to the storage control apparatus, as a total average response interval;

calculating an average connection count per command for the command target storage apparatus for a command target storage apparatus to which the command is to be issued;

calculating an average connection count per command for all of the plurality of storage apparatuses connected to the storage control apparatus;

calculating a response delay coefficient, based on the average connection count for the command target storage apparatus and the average connection count per command for all of the plurality of storage apparatuses connected to the storage control apparatus;

calculating an operation response interval by applying the response delay coefficient to the total average response interval; and calculating a new reference time for the command target storage apparatus by setting the calculated operation response interval as a new response interval and adding the new response interval and the command delay time, and setting the newly calculated reference time as a reference time for the command target storage apparatus.

8. The method of setting a reference time according to claim 7, further comprising, when an error is detected in the command target storage apparatus while the storage control apparatus operates, measuring a delay time of a command response when the error occurs, as an on-error command delay measured time; and calculating an on-error command delay time based on the command delay time and the on-error command delay measured time, wherein the calculating the reference time calculates a new reference time for the command target storage apparatus in which the error is detected by setting the calculated on-error command delay time as the new command delay time, and adding the response interval and the new command delay time, and sets the newly calculated reference time as a reference time for the command target storage apparatus.

9. A computer-readable storage medium storing a reference time setting program that makes a computer set a reference time used for detecting, in a storage control apparatus connected to storage apparatuses of a plurality of types, an abnormality when a command is executed to the storage apparatuses, the program making the computer:

select storage apparatuses to be examined from each of the plurality of types of the storage apparatuses;

generate a medium error status in the storage apparatuses to be examined;

issue a first test command while generating the medium error status in the storage apparatuses to be examined, and measure a delay time of a command response for the first test command as a command delay time;

issue a plurality of second test commands to the storage apparatuses to be examined under a higher load when no error occurs, and measure an interval of each command response for the plurality of second test commands as a response interval; and calculate, for each of the plurality of types of the storage apparatuses, a reference time for each storage apparatus type by adding the command delay time and the response interval.

10. The computer-readable storage medium according to claim 9, wherein the program makes the computer generate the medium error status, select the storage apparatuses, measure the command delay time, and calculate the reference time are executed when the storage control apparatus is being started.

11. The computer-readable storage medium according to claim 9, wherein the program makes the computer, when a command is issued to a storage apparatus, calculate an average of the response intervals for all of the plurality of storage apparatuses connected to the storage control apparatus, as a total average response interval;

calculate an average connection count per command for the command target storage apparatus for a command target storage apparatus to which the command is to be issued;

calculate an average connection count per command for all of the plurality of storage apparatuses connected to the storage control apparatus;

calculate a response delay coefficient, based on the average connection count for the command target storage apparatus and the average connection count per command for all of the plurality of storage apparatuses connected to the storage control apparatus;

calculate an operation response interval by applying the response delay coefficient to the total average response interval; and calculate a new reference time for the command target storage apparatus by setting the operation response interval as a new response interval and adding the new response interval and the command delay time, and set the newly calculated reference time as a reference time for the command target storage apparatus.

12. The computer-readable storage medium according to claim 11, wherein the program makes the computer, when an error is detected in the command target storage apparatus while the storage control apparatus operates, measure a delay time of a command response when the error occurs, as an on-error command delay measured time; and calculate an on-error command delay time based on the command delay time and the on-error command delay measured time, wherein a new reference time is calculated for the command target storage apparatus in which the error is detected by setting the calculated on-error command delay time as the new command delay time, and adding the response interval and the new command delay time, and the newly calculated reference time is set as a reference time for the command target storage apparatus.

* * * * *